United States Patent [19]

Blomberg et al.

[11] Patent Number: 5,373,246
[45] Date of Patent: Dec. 13, 1994

[54] DIGITAL FFSK DEMODULATOR

[75] Inventors: Hans C. Blomberg; Soren Hojsteen, both of Hørsholm, Denmark

[73] Assignee: Motorola, Inc., Schaumburg, Ill.

[21] Appl. No.: 141,469

[22] Filed: Oct. 22, 1993

[51] Int. Cl.$^5$ ............................................. H04L 27/14
[52] U.S. Cl. .................................. 329/300; 329/302; 375/80; 375/88
[58] Field of Search ............... 329/300, 301, 302, 303; 375/80, 82, 88

[56] References Cited

U.S. PATENT DOCUMENTS

| | | |
|---|---|---|
| 4,384,357 | 5/1983 | deBuda et al. ................ 329/302 X |
| 4,561,098 | 12/1985 | van Tol ........................ 329/302 X |

OTHER PUBLICATIONS

Product Data Sheet for FX419 of Consumer Microelectronics Ltd., Nov. 1986.
Laboratoriet for Akustik, Sep. 1986, pp. 18 and 19.

*Primary Examiner*—Siegfried H. Grimm
*Attorney, Agent, or Firm*—Hugh Dunlop; Pedro P. Hernandez

[57] ABSTRACT

A digital fast frequency shift keying (FFSK) demodulator for demodulating an FFSK signal having components at first and second frequencies f0 and f1. The FFSK signal is sampled and the samples are processed in an arrangement which includes a monostable function (50) and a digital notch filter (51) for distinguishing between the components to provide a demodulated output. The digital notch filter (51) is arranged to filter out frequencies which are multiples of the frequencies f0 and f1.

6 Claims, 3 Drawing Sheets

5,373,246

DIGITAL FFSK DEMODULATOR

FIELD OF THE INVENTION

This invention relates to a digital fast frequency shift keying (FFSK) demodulator.

BACKGROUND OF THE INVENTION

FFSK demodulators are known from, for example, European Patent Application No. 0396970 assigned to Storno A/S. Such known demodulators use 64 times up sampling before low pass filtering the signal to provide the data bit stream. When such a technique is used, the filter to remove the unwanted signals can be made as a simple first order low pass filter. The drawback of this method is a complex and gate consuming up sampling network, which also has high current drain.

The company Consumer Micro Circuits Ltd supplies a decoder circuit having the product designation FX419 which uses a combination of a digital and an analog filter to provide the appropriate attenuation of unwanted signals. In more detail, the circuit provides a receive band pass filter which filters the received FFSK signal, followed by a limiter, followed by a monostable "one-shot" which doubles the frequency of the signal, coupled to and followed by a digital filter which in turn provides its output to an analog low pass filter which provides the demodulated bit stream, which is limited in a limiter to provide an unclocked squared receive data stream. The use of an analog filter is disadvantageous, as it is unsuitable for implementation in a gate array for other digital implementation and is therefore difficult to integrate and miniaturise.

There is a need for an improved FFSK demodulator.

SUMMARY OF THE INVENTION

According to the present invention, an FFSK demodulator is provided comprising an input for receiving an FFSK signal having components at first and second frequencies (f0 and f1), digitizing means coupled to the input for providing a first set of digital samples of the FFSK signal and processor means for processing said samples. The processing means include means for performing a monostable function to provide a second set of samples and comprise digital notch filter means operable on said second set of samples for distinguishing between said components to provide a demodulated output. The digital notch filter means are arranged to attenuate frequencies which are multiples of the frequency f0 and f1.

The notch filter means preferably comprise a finite impulse response filter.

The notch filter means preferably have an equivalence to first and second integrators arranged in series. The first integrator preferably attenuates components of the signal at multiples of f0 and the second integrator attenuates components of the signal at multiples of f1.

A particularly advantageous feature is that of arranging the digitizing means to sample the signal at a sampling frequency fs which is selected from the set: fs={2.n.f0, 2.m.f1} where n and m are integers.

Other features and advantages will be understood from the following description of a preferred embodiment of the invention which is given by way of example only.

DETAILED DESCRIPTION OF THE PREFERRED EMBODIMENT

Figure 1:
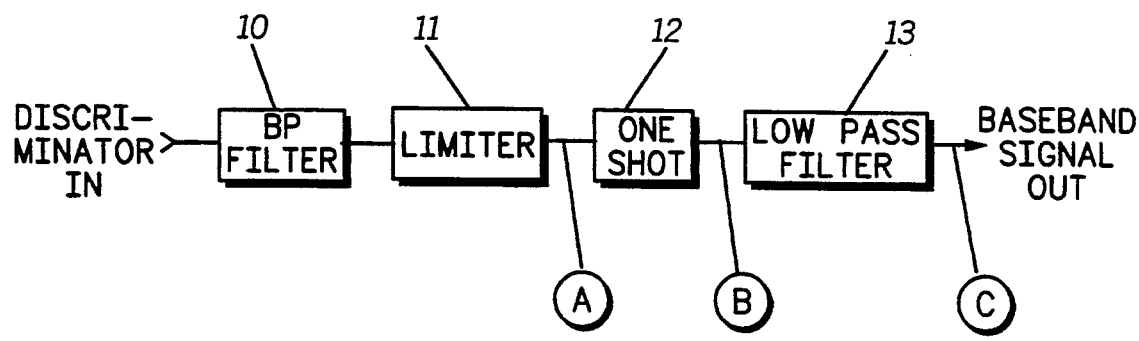
FIG. 1 shows a prior art FFSK demodulator.
Figure 2:
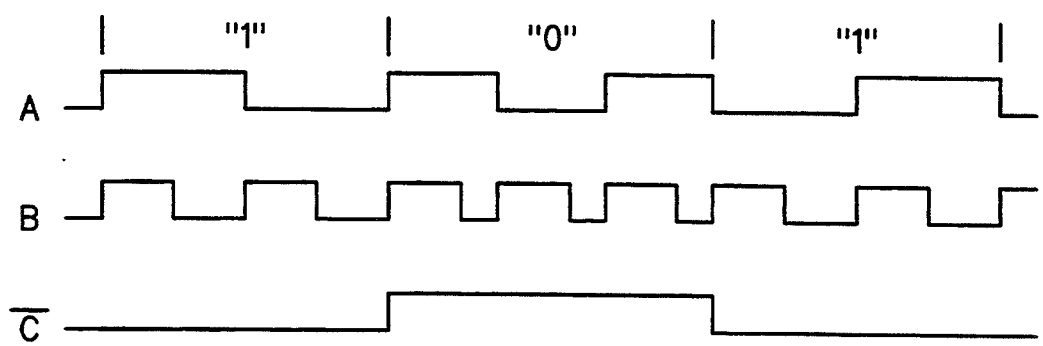
FIG. 2 shows signals passing through the demodulator of FIG. 1.

Referring first to the prior art of FIG. 1, the FFSK demodulator shown comprises a band pass filter 10 coupled to a limiter 11 coupled in turn to a one-shot 12 coupled to a low pass filter 13. An FFSK signal is supplied to the input of the band pass filter 10, for example from a radio frequency receiver for a telephone modem. The band pass filter 10 cleans up the signal so as to select only the two frequencies of the FFSK signal, f0 and f1. These frequencies may, for example, be 1200 Hz and 1800 Hz. The limiter 11 squares off the signal to provide the signal A found in FIG. 2. The one-shot 12 provides a monostable function which is triggered on each edge of the signal from limiter 11 and effectively doubles the frequency to the signal. This provides the signal B shown in FIG. 2. The low pass filter 13 has a cut off frequency between 2400 Hz and 3600 Hz, thereby discriminating between the two frequencies and providing (shown inverted) the signal C of FIG. 2. This is the output base band signal.

Figure 3:
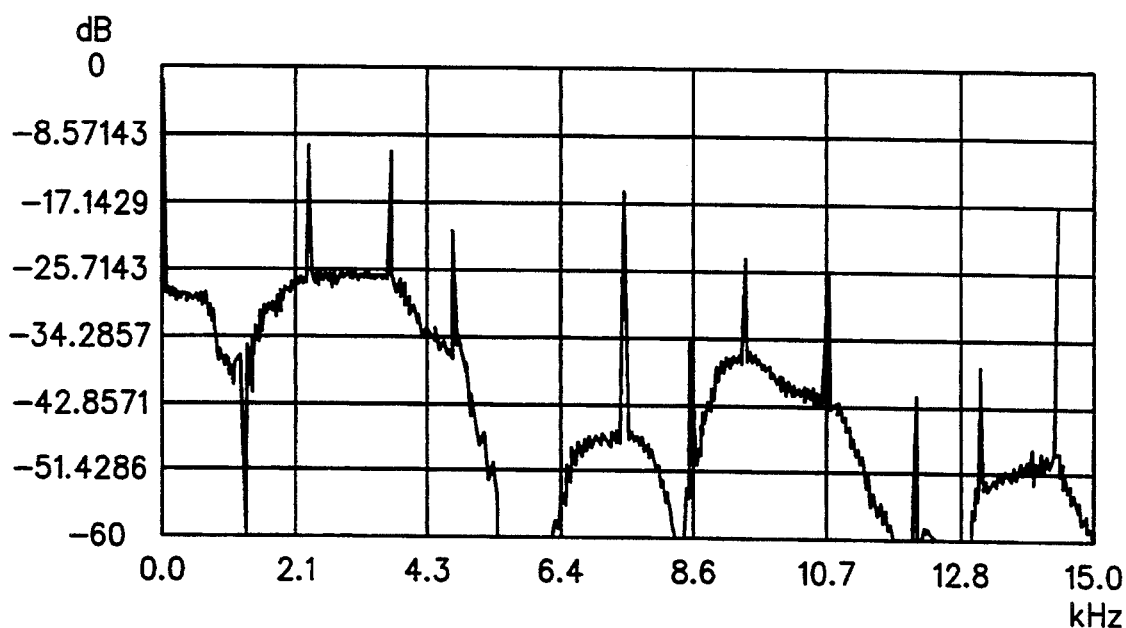
FIG. 3 shows the frequency spectrum of the output of the one-shot in FIG. 1, that is to say the spectrum of the signal B in FIG. 2.

The frequency spectrum of the one-shot output 12 in the case of 1200 baud FFSK is shown in FIG. 3. As can be seen, there are significant spikes in this signal across a wide frequency range. These are harmonics of the basic frequencies f0 and f1 and are problematic. It is on account of these spikes that previous artisans have employed a separate digital filter to first digitize, then filter, and then reconvert to analog form a signal before filtering in the low pass filter 13.

Figure 4:
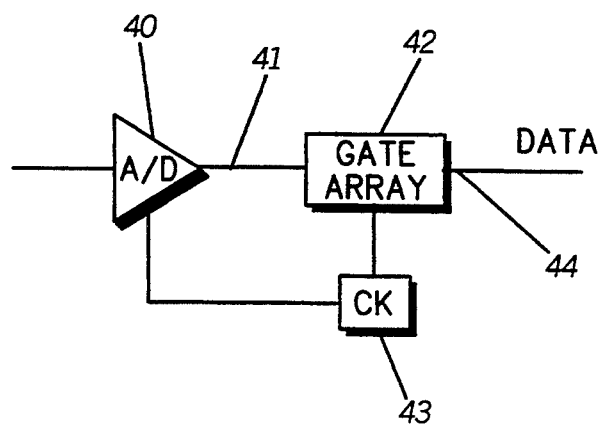
FIG. 4 shows a digital FFSK demodulator in accordance with the preferred embodiment of the invention.

Referring now to FIG. 4, the invention in its preferred embodiment is shown in which the FFSK signal is input to an analog-digital-convertor 40, which provides a digital input 41 to a gate array 42. The analog-digital-convertor 40 and the gate array 42 are under the control of a clock 43. Data is output from the gate array 42 at a digital output 44, which may be provided to a micro processor. Instead of a gate array, a DSP may be used. The output may be supplied to a display or in other form.

In the circuit of FIG. 4, the clock 43 causes the input analog signal to be sampled by the analog-digital-convertor 40 at a sampling rate. The sampling rate is selected from the following set in the case of 1200 baud FFSK:

fs=n*2400Hz, and fs=m*3600Hz, where n and m are integers.

Which is simplified to:

fs=n*7200Hz, where n is an integer (using 1200 baud FFSK).

These samples are processed in gate array 42, which performs the function of a one-shot, a digital filter and a low pass filter.

Figure 5:
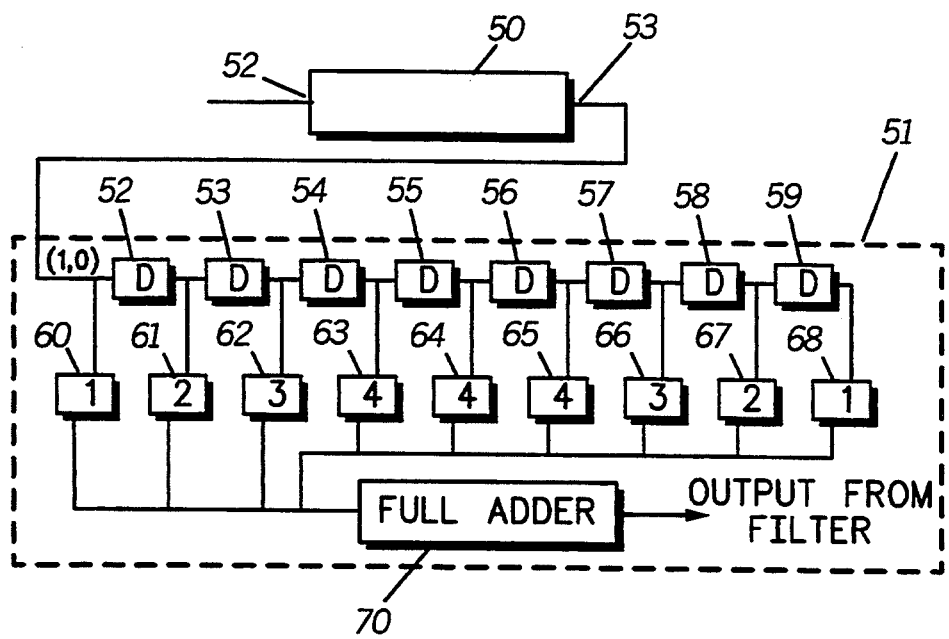
FIG. 5 shows the digital filter implemented in the gate array of FIG. 4

These elements are shown in FIG. 5. The one-shot takes the form of a 24-clock counter 50. The filter is a digital FIR filter 51. When a rising edge appears on input 52 of counter 50, the counter is loaded with the value 24 and on each occurrence of a clock, it counts down. During the counting down period, ones are output on the output 53. When the counter has reached 0, zeros are outputted. In this manner a second set of samples is provided at output 53. The clock frequency for the counter 50 is 144 kHz.

In an alternative implementation of the circuit of FIG. 5, the output of the counter 50 can be down converted to a four level signal at 36 kHz, for processing in the filter 51. For simplicity, this is not shown in detail.

The filter 51 comprises eight delay elements 52 to 59 and nine tap elements 60 to 68. The gate array 42 implements all the taps as integers. Many of the taps are identical and reuse of taps is possible. The implementation and construction of a filter of this nature can be found in the book Laboratoriet for Akustik, September 1986 in Chapter 2 by Simon Pedersen, pp. 18 and 19. This document is incorporated herein by reference. The outputs of the tap elements 60 to 68 are summed in a full adder 70. The adder 70 provides the output data stream.

There now follows a description of the construction of the filter 51.

A near optimum filter should have the following characteristics:

$H(f) = 0$ for $f = n*f_1 f = n*f_2$, where n is an integer;

linear phase (symmetric finite impulse response (FIR));

integer filter constants;

large attenuation above 600 Hz;

low attenuation below 600 Hz;

The basic building block for this filter is the digital integrator g (n), which is described by:

$$g(n) = \frac{1}{N} \sum_{q=n-N+1}^{n} \times (q)$$

The frequency response is:

$$H(f) = \frac{1}{N} \frac{\sin(\pi f N \Delta T)}{\sin(\pi f \Delta T)} \exp(-jf\pi(N-1)\Delta T)$$

From H(f) it appears that the digital integrator is capable of making notches at:

$$f_{zero} = \frac{fs}{N}$$

This new filter is found by putting two integrators in series. The first integrator takes care of the $n*f_0$ and the second takes care of the $n*f_1$. This will make almost no Inter Symbol Interference (ISI) and the attenuation at 600 Hz will be:

$H(600) = H_1(600)*H_2(600) = 0.91$ dB $-0.40$
dB $= -1.31$ dB.

With alternating data (1010..) the worst case "eye" will be 86.0% open.

The two integrators in series are shown implemented as one new filter:

$a(n) = h_1(n)*h_2(n)$.

Since h(n) is a unity square function, a(n) will be a tetrad function, which still will have integer filter taps. If $h_1$ (n)=(1,1,1,1,1,1) and $h_2$ (n)=1,1,1,1), the convolution will be, for example:

$a(n) - (1,2,3,4,4,4,3,2,1)$

These values represent multiplier factors for the tap elements 60–68. in order to place the notches at the exact frequency, the sampling frequency should be selected from the following set, when we use 1200 baud FFSK:

fs=n*2400 Hz, and fs=m*3600 Hz, where n and m are integers.

Which is simplified to:

fs=n*7200 Hz, where n is an integer (using 1200 baud FFSK).

At 36k Hz, the filters to be used are, for example:

h1(n)={1,1,1,1,1,1,1,1,1,1} h2(n)={1,1,1,1,1,1,1,1,1,1,1,1,1,1} a(n)={1,2,3,4,5,6,7,8,9,10,10,10,10,10,10,9,8,7,6,5,4,3,2,1}.

Figure 6:
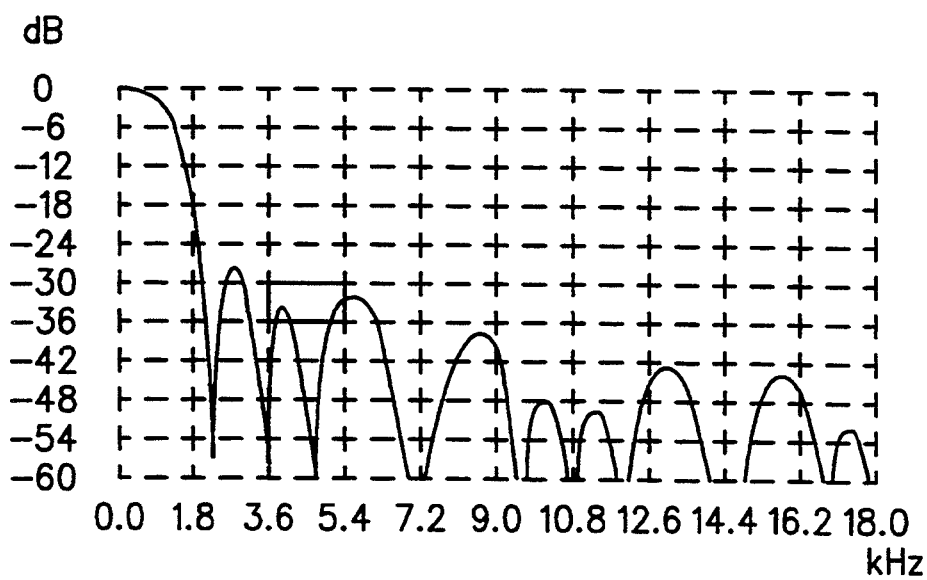
FIG. 6 shows the transfer function of the filter of FIG. 5.

The filter 51 has the notch filter amplitude transfer function shown in FIG. 6 when 1200 baud FFSK is used and the sampling frequency is 36 kHz. It is to be noted that the notches in the filter of FIG. 6 coincide with the spikes in the output from the one-shot shown in FIG. 3.

For improved operation, the filter 51 can further be followed by a low pass digital filter to increase the ratio between the 2400 Hz and 3600 Hz elements.

The invention takes advantage of a feature of digital filters which in other circumstances is considered problematic, that is to say the numerous notches in the filter across the frequency range. By careful consideration of the structure of the filter and preferably also consideration of the sampling rate, it is arranged that the notches in-the filter transfer function coincide with multiples of the frequencies f0 and f1, thereby attenuating frequencies which are multiples of said frequencies.

We claim:

1. An FFSK demodulator comprising:
    an input for receiving an FFSK signal comprising components at first and second frequencies f0 and f1;
    digitizing means coupled to the input for providing a first set of digital samples of the FFSK signal;
    processor means for processing said samples, including means for performing a monostable function to provide a second set of samples, digital notch filter means operable on said second set of samples for distinguishing between said components to provide a demodulated output, wherein
    the digital notch filter means are arranged to filter out frequencies which are multiples of said frequencies f0 and f1.

2. A demodulator according to claim 1 wherein said digital notch filter means comprise a finite impulse response filter.

3. A demodulator according to claim 1 wherein said digital notch filter means have an equivalence to first and second integrators in series.

4. A demodulator according to claim 3 wherein the first integrator attenuates components of the signal at multiples of f0 and the second integrator attenuates components of the signal at multiples of f1.

5. A demodulator according to any one of the preceding claims wherein the digitizing means samples the signal at a sampling frequency fs selected from the set fs={2.n.f0, 2.m.f1} where n and m are integers.

6. A method of demodulating an FFSK signal comprising components at first and second frequencies f0 and f1, the method comprising the steps of:

digitizing the FFSK signal to provide a first set of digital samples of the signal;

processing said samples, including performing a monostable function to provide a second set of samples, and performing a filtering operation on said second set of samples for distinguishing between said components to provide a demodulated output, wherein the filtering operation is performed by digital notch filter means arranged to filter out frequencies which are multiples of said frequencies f0 and f1.

* * * * *